United States Patent
Korzhenko et al.

(10) Patent No.: US 6,790,530 B2
(45) Date of Patent: Sep. 14, 2004

(54) CONDUCTIVE POLYMERIC COMPOSITE MATERIAL WITH A RESISTANCE WHICH IS SELF-REGULATED BY THE TEMPERATURE

(75) Inventors: Alexander Korzhenko, Le Mans (FR); Emmanuel Rastelletti, Nassandres (FR); R. G. Sharpe-Hill, County Down (IE)

(73) Assignee: ATOFINA, Puteaux (FR)

( * ) Notice: Subject to any disclaimer, the term of this patent is extended or adjusted under 35 U.S.C. 154(b) by 0 days.

(21) Appl. No.: 10/608,149

(22) Filed: Jun. 30, 2003

(65) Prior Publication Data

US 2004/0001954 A1 Jan. 1, 2004

Related U.S. Application Data

(63) Continuation of application No. 09/986,448, filed on Nov. 8, 2001, now abandoned.

(30) Foreign Application Priority Data

Nov. 13, 2000 (FR) .............................. 00 14544
Feb. 20, 2001 (FR) .............................. 01 02264

(51) Int. Cl.$^7$ ................... B32B 18/00; B32B 27/06; C08L 27/16; H01B 1/12

(52) U.S. Cl. .................. 428/421; 252/511; 252/519.33; 524/545; 524/546

(58) Field of Search ............................ 252/511, 519.33; 428/421; 524/545, 546

(56) References Cited

U.S. PATENT DOCUMENTS 4,636,331 A * 1/1987 Sako et al. .................. 252/511
5,093,036 A * 3/1992 Shafe et al. ................ 252/511

* cited by examiner

Primary Examiner—Ramsey Zacharia
(74) Attorney, Agent, or Firm—Millen, White, Zelano & Branigan, P.C.

(57) ABSTRACT

The present invention relates to a composite material comprising, by weight, the total being 100% : A) 40 to 90% of PVDF homopolymer or copolymer crystallized essentially in the β form, B) 10 to 60% of a conductive filler, C) 0 to 40% of a crystalline or semi-crystalline polymer, D) 0 to 40% of a filler other than C, such that the crystals in the β form are nucleated on the surface of the particles of the conductive filler. This material is conductive with a resistance which is self-regulated by the temperature. It shows an increase in the resistance as a function of the temperature (PTC or "Positive Temperature Coefficient" effect), so that the intensity stabilizes at an equilibrium temperature.

13 Claims, 2 Drawing Sheets

CONDUCTIVE POLYMERIC COMPOSITE MATERIAL WITH A RESISTANCE WHICH IS SELF-REGULATED BY THE TEMPERATURE

The present invention relates to a conductive polymeric composite material with a resistance which is self-regulated by the temperature. It is more particularly a fluoropolymer comprising a conductor, such as, for example, carbon black or any other electrically conductive material.

It is possible to render a composite conductive by incorporation of graphite in a polymer matrix. The application of a sufficient voltage results in heating by the Joule effect. In the absence of a circuit breaker mechanism, the temperature increases until the material is destroyed. The material of the present invention is based on a fluoropolymer comprising, as filler, a conductor, such as, for example, graphite, which shows an increase in the resistance as a function of the temperature (PTC or "Positive Temperature Coefficient" effect), so that the intensity stabilizes at an equilibrium temperature. This PTC effect thus makes possible thermal control of the intensity of the current. It exhibits numerous advantages by comparison with conventional resistances:

The control of electric heating systems is conventionally obtained by inclusion of a thermal circuit breaker in the circuit. In the event of failure of the circuit breaker, the circuit or the safety fuse is blown. The PTC material is self-controlled without it being necessary to include either a circuit breaker or a fuse.

The PTC heating system exhibits a reduced risk of combustion and of short circuit.

In the event of involuntary earthing of a PTC heating element region, short circuiting does not occur.

The PTC effect generates a moderate temperature, which is beneficial in 2 respects in comparison with conventional systems
  The specifications imposed on insulating materials should be less strict;
  The introduction of heat takes place over a more extensive surface area.

The composite material can be converted by the methods used in the plastics industry (coextrusion, moulding, and the like). It can also be applied as a paint to insulating substrates, whatever their geometry.

The prior art has disclosed two types of composite polymer systems which exhibit the PTC effect.

According to a first type, the PTC effect is based on the phenomenon of expansion of the polymer crystals disrupting the network of the conductive filler. The resistance of the composite slowly decreases when the amount of carbon black in a semi-crystalline polymer matrix is increased, to a concentration where the resistance falls. The latter represents a geometric transition which is known as the percolation threshold. It has been found that the maximum in the PTC effect corresponds to a critical concentration which is found in the vicinity of the percolation threshold. When the temperature of the material approaches the melting temperature of the matrix, an expansion in the crystalline region triggers the PTC effect. However, a high energy of the carbon black particles and a low shear modulus of the matrix result in a fall in resistance, known as the NTC (Negative Temperature Coefficient effect). This first type is described in the following references (CA denotes Chemical Abstracts):

131:243891 CA
  TI Organic PTC thermistor materials with high transitive temperature
  AU Yang, Fubiao; Li, Yongqin; Li, Xiaojun
  CS Department 5, National University of Defense Technology, Changsha, 410073, Peop. Rep. China
  SO Gongneng Cailiao (1998), 29(Suppl.), 724–725
  CODEN: GOCAEA; ISSN: 1001-9731
  PB Gongneng Cailiao Bianjibu
129:331461 CA
  TI Effect of thermal treatment on crystallization and PTC properties of conductive PVDF/CB composite
  AU Wang, Jikui; Wang, Gengchao; Zhang, Bingyu; Fang, Bin; Zhang, Zhiping
  CS Inst. Mater. Sci. Eng., East China Univ. Sci. Technol., Shanghai, 200237, Peop. Rep. China
  SO Gaofenzi Cailiao Kexue Yu Gongcheng (1998), 14(5), 93–95
  CODEN: GCKGEI; ISSN: 1000-7555
  PB "Gaofenzi Cailiao Kexue Yu Gongcheng" Bianjibu
125:277325 CA
  TI Influences of crystallization histories on PTC/NTC effects of PVDF/CB composites
  AU Zhang, Mingyin; Jia, Wentao; Chen, Xinfang
  CS Dep. Materials Science, Jilin Univ., Changchun, 130023, Peop. Rep. China
  SO J. Appl. Polym. Sci. (1996), 62(5), 743–747
  CODEN: JAPNAB; ISSN: 0021-8995
104:121274 CA
  TI Heaters
  IN Shibata, Tsuneo; Nishida, Takeo; Terakado, Masayuki; Nitta, Isao
  PA Matsushita Electric Industrial Co. Ltd., Japan
  SO Jpn. Tokkyo Koho, 5 pp.
  CODEN: JAXXAD According to a second type, the PTC effect is based on the presence of two immiscible polymers. Among the materials of this type, PVDF/HDPE systems comprising carbon black as filler are the most well known. The PVDF and HDPE phases are immiscible and thus the PTC effect in this case depends very much on the morphology and on the distribution of the carbon black between these two phases. The carbon black is preferably dispersed in the HDPE phase, which becomes the conductive phase. If the PVDF is in good equilibrium with respect to the HDPE, the PVDF phase forms a specific structure which is favourable to the PTC effect. A remarkable distribution of the conductive PE phase in the PVDF phase is the condition for thwarting the NTC effect, which is produced at the melting point of the HDPE, which is lower than that of the PVDF. This second type is described in the following references:

131:287163 CA
  TI Carbon black-filled immiscible blends of poly (vinylidene fluoride) and high density polyethylene: the relationship between morphology and positive and negative temperature coefficient effects
  AU Feng, Jiyun; Chan, Chi-Ming
  CS Department of Chemical Engineering Advanced Engineering Materials Facility, The Hong Kong University of Science and Technology, Kowloon, Hong Kong
  SO Polym. Eng. Sci. (1999), 391(7), 1207–1215
  CODEN: PYESAZ; ISSN: 0032-3888
  PB Society of Plastics Engineers
130:96227 CA
  Ti Carbon black-filled immiscible blends of poly (vinylidene fluoride) and high density polyethylene: electrical properties and morphology
  AU Feng, Jeng; Chan, Chi-Ming CS Dep. of Chemical Engineering, Advanced Engineering Materials Facility, The Hong Kong University of Science and Technology, Kowloon, Hong Kong SO Polym. Eng. Sci. (1998), 38(10), 1649–1657

CODEN: PYESAZ; ISSN: 0032-3888

PB Society of Plastics Engineers

130:52964 CA

TI Carbon black-filled immiscible blend of poly (vinylidene fluoride) and high-density polyethylene: electrical properties and morphology AU Feng, Jiyun; Chan, Chi-Ming CS Department of Chemical Engineering, The Hong Kong University of Science and Technology, Kowloon, Hong Kong SO Annu. Tech. Conf.-Soc. Plast. Eng. (1998), 56th (Vol. 2), 2476–2480

CODEN: ACPED4; ISSN: 0272-5223

PB Society of Plastics Engineers and, finally, Patent Application WO 9805503.

It has now been found that a composite material composed (i) of a blend of PVDF homopolymer or copolymer crystallized essentially in the β form and (ii) of a conductive filler, such that the crystals in the β form are nucleated on the surface of the particles of the conductive filler, exhibits the PTC effect but according to a mechanism different from the prior art.

The PVDFs used in the composite crystallize in the β form (or the I form). This is a piezoelectric polar crystalline arrangement, the crystals of which are capable of being oriented in the direction of the electric field and contributing to the transportation of charges. For example, as regards a PVDF copolymer (VF2, HFP and TFE), this morphological arrangement is disrupted with the temperature as the surface of the crystals, rich in HFP and TFE units, is disturbed by the melting, the transfer of charges between particles of the conductive filler slows down and the resistance increases, which is reflected by the PTC effect.

SUMMARY OF THE INVENTION

Figure 1:
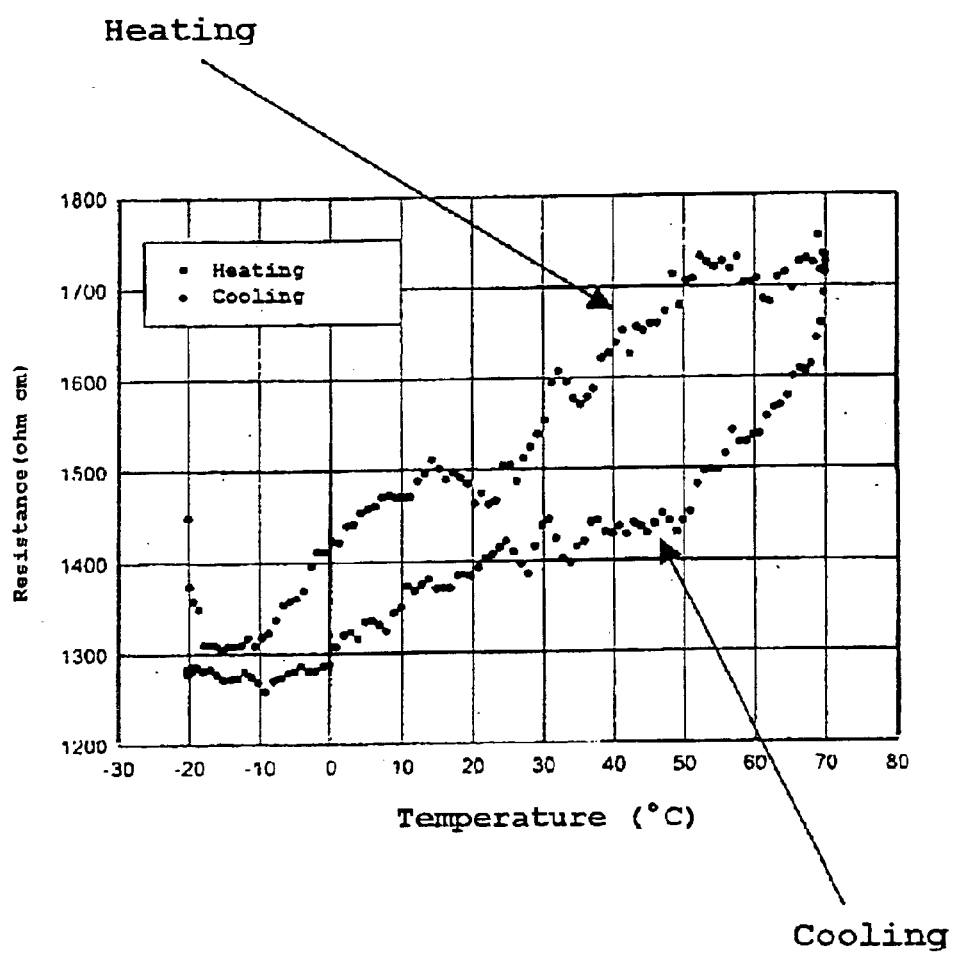
FIG. 1 is a graph of resistance versus temperature for the material of Example 1.

The present invention relates to a composite material comprising, by weight, the total being 100%:

A) 40 to 90% of PVDF homopolymer or copolymer crystallized essentially in the β form, B) 10 to 60% of a conductive filler, C) 0 to 40% of a crystalline or semi-crystalline polymer, D) 0 to 40% of a filler other than C, such that the crystals in the β form are nucleated on the surface of the particles of the conductive filler.

For a "heating" application with self control of the temperature, the material displaying the PTC effect of the present invention, based on the piezoelectric properties of the polymer used, has numerous advantages with respect to the materials already described:

In our system, the resistance also depends on the concentration of the conductive filler, which, however, is not limited to a critical concentration; the PTC effect is thus observed over a very broad resistance range. This thus makes it possible to adjust, by the content of conductive filler, the voltage level for obtaining the Joule effect necessary for good self control of the temperature by the PTC effect.

The material of the invention exhibits a PTC effect over a broad temperature range extending from the glass transition temperature (approximately −30° C.) to the melting temperature (90 to 165° C., according to the formulation), whereas, for the materials of the prior art, the temperature range where control is exerted is restricted to the melting temperature of the crystalline region. There is thus a considerable improvement in the material with the PTC effect, which makes it possible to obtain and to control the desired temperature over a huge temperature range below the melting temperature.

The peak of the PTC/NTC effect is much narrower for the systems of the prior art. The composite of the present invention, by better self control at lower temperatures, has less risk of exceeding the temperature of this peak and then of being overheated.

The material of the present invention regenerates its morphology after being overheated, whereas the reversibility is uncertain for the composites of the prior art.

The composite proposed is readily soluble in the usual solvents. The material prepared from the solution or from the melt has the same properties, whereas the polymers used in the composites of the prior art are very difficult to dissolve.

The material of the invention is applied as a coating deposited on an insulating substrate such as ceramic, glass, wood, textile fibers, fabrics and any insulating area. In order to prepare it, it is sufficient to disperse the conductive filler (B) in the polymer (A), which can either be in the molten state or in solution in an appropriate solvent, such as, for example, acetone or N-methylpyrrolidone. The polymer (A) comprising the filler (B) and optionally (C) and (D), which is either in the molten state or in a solvent, is applied as a paint to the insulating surface (preferably a ceramic). The metal terminals for connection to the electric circuit can be positioned at the ends of the coating, before or after application. After cooling the molten polymer or after drying in order to remove the solvent, the heating element is ready.

Heating is produced during the passage of an electric current i. According to the Joule effect, the amount of heat W given off during a time t is:

$$W=Ri^2t.$$

This equation shows that efficient heating can be provided on condition that the resistance of the system is such that the intensity of the current is sufficient at the applied voltage. This optimization is carried out by a variation in the polymer/conductive filler proportion.

On a macroscopic scale, the composite material is provided as a matrix of the polymer (A) comprising the filler (B). For example, if (A) is a copolymer of vinylidene fluoride (VF2), of tetrafluoroethylene (TFE) and of hexafluoropropylene (HFP) (Kynar® 9301) comprising graphite as filler, on a macroscopic scale the composite is provided as a matrix of this copolymer comprising graphite as filler. The space between the graphite particles is divided between the crystals of β type (a trans-trans-trans polar structure) and an amorphous region composed of HFP and TFP units. In order to raise the upper limit of the control temperature region, an amount (up to 40%) of PVDF or of its copolymer with trifluoroethylene or tetrafluoroethylene can be added, provided that a portion of VF2 crystallizes in the β-type form. The composition can comprise (C) and/or (D) in order to modify the mechanical properties.

As regards the polymer (A) and more particularly the copolymers, the comonomer is advantageously chosen from the compounds which comprise a vinyl group capable of being opened in order to be polymerized and which comprise, directly attached to this vinyl group, at least one fluorine atom, one fluoroalkyl group or one fluoroalkoxy group.

Mention may be made, as examples of comonomers, of vinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$, in which n is 1, 2, 3, 4 or 5; the product of formula $R1CH_2OCF=CF_2$ in which R1 is hydrogen or $F(CF_2)_z$ and z has the value 1, 2, 3 or 4; the product of formula $R3OCF=CH_2$, in which R3 is $F(CF_2)_z$— and z is 1, 2, 3 or 4; (perfluorobutyl)ethylene (PFBE); 3,3,3-trifluoropropene and 2-trifluoromethyl-3,3,3-trifluoro-1-propene. Several comonomers can be used.

The polymer (A) in the composite material is crystallized in the β form either because it was already in the β form before it was mixed with the conductive filler (B) or because, during the preparation of the composite, it crystallized in this β form. For example PVDF copolymer dissolved in a solvent without any filler is crystallized in the β form when the solvent is allowed to evaporate. According to another method, PVDF homopolymer or copolymer in the presence of the fillers (B), iscrystallized in the β form after a heat treatment followed by a slow cooling. It would not be departing from the scope of the invention if the polymer (A) is not crystallized entirely in the β form but this proportion of β form must be sufficient to result in the PTC effect. Advantageously, this proportion of β form in the polymer (A) must be at least 60% and preferably 75%. The presence of the piezoelectric crystalline phase is not the sole condition for obtaining the PTC effect. The crystals in the β form (or the I form) must be nucleated on the surface of the particles of a conductive filler, such as, for example, graphite.

Mention may be made, as examples of the polymer (A), of PVDF homopolymer exhibiting any level of defects (the term "reversal defect" or "degree of reversal" is also used). The term reversal defect is understood to mean any combination of $-CH_2-CF_2-CF_2-CH_2-$ type along the polymer chain (combination also known as head—head, in contrast to the head-tail combination of $-CH_2-CF_2-CH_2-CF_2-$ type). The degree of defects can be measured using proton NMR; the degree of reversal defects is thus generally given as a percentage.

Mention may also be made of copolymers of VF2 and of VF3 having at least 60 mol % of VF2 and advantageously at least 75 mol %; or copolymers of VF2, of TFE and of HFP having at least 15 mol % of TFE units and advantageously VF2-TFE-HFP copolymers with the respective molar composition 60 to 80/15 to 20/0 to 25.

As regards the conductive filler (B), it can be chosen from any powders formed of materials which conduct electricity and advantageously metal powders, carbon black, graphite and metal oxides, such as those cited in patent FR 2774100. By modifying the proportion of (B) and (A) and at constant voltage, it is possible to modify the temperature obtained by the PTC effect. This temperature can be between the melting temperature and −50° C. and advantageously between −20° C. and 130° C. The greater the proportion of (B), the higher the temperature.

As regards the polymer (C), this is any polymer which does not disturb the crystallization of the polymer (A). Mention may be made, as examples, of PVDF homopolymer which is not in the β form and VF2-HFP copolymers comprising at least 85% of VF2 and advantageously at least 90%.

As regards the filler (D), mention may be made of the usual fillers for fluoropolymers, such as silica, PMMA or UV inhibitors.

The composite material of the invention can be prepared according to two processes. According to the first, the various constituents (A), (B) and optionally (C) and/or (D) are compounded, so that (A) is in the molten state, and then the product obtained is applied to the insulating surface. The usual devices for compounding thermoplastic polymers, such as mixers or extruders, can be used. It would not be departing from the scope of the invention to cool and to store in the form of granules the product obtained on conclusion of this compounding operation, then, subsequently, heat it in order to melt it and to apply it to the insulating surface.

According to the second process, the various constituents (A), (B) and optionally (C) and/or (D) are placed in a solvent until a thick dispersion is obtained, which dispersion can be applied as a paint to the surface of the insulating material. The solvent can be chosen from acetone, isophorone, dimethylformamide (DMF), methyl ethyl ketone (MEK) and N-methylpyrrolidone (NMP).

These two processes can also be combined, for example by melt blending (A) and (B) and then by dissolving the combined mixture and optionally (C) and/or (D) in a solvent.

The present invention also relates to the heating devices comprising the composite material described above.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above or below, and of corresponding French application no. 00/14544, filed Nov. 13, 2000, and French application number 01/02264, filed Feb. 20, 2001 are hereby incorporated by reference.

EXAMPLE 1

The following formulation, by weight, gives good heat control when it is applied between the terminals separated by 10 cm and is placed under a voltage of 110 V.

Kynar® 9301 —52%

Graphite 9000 (particles of the order of 5–10 μm)—48%
  100 parts of the above composition are dissolved in 30 parts of acetone.
  Kynar® 9301 denotes a VF2-TFE-HFP copolymer in the respective proportions, in moles, of 72/18/10,
  Graphite 9000 Denotes Particles of the Order of 5–10 μm.

Figure 2:
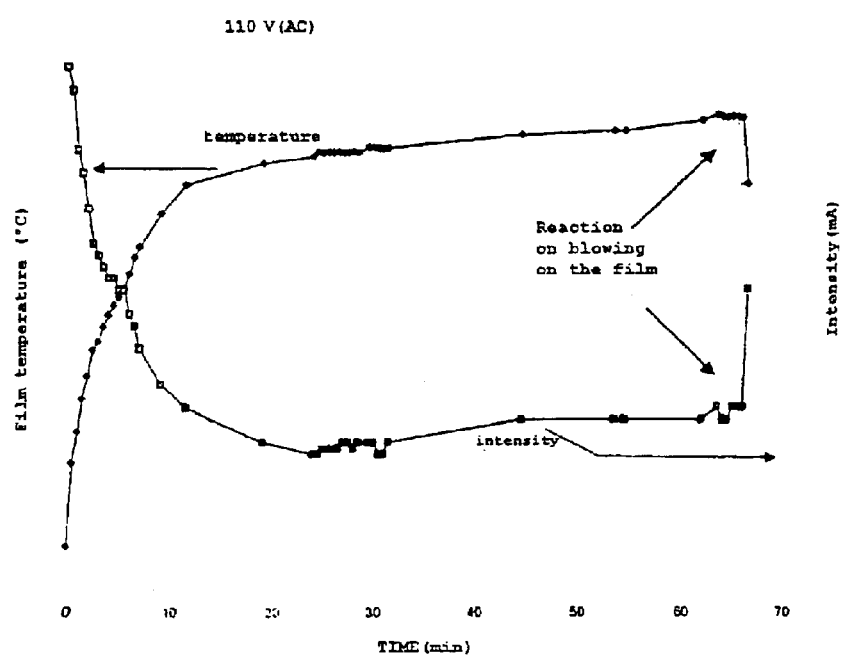
FIG. 2 is a graph of film temperature and intensity over time for the material of Example 1.

The blend is applied to a 10×10 cm ceramic plate. Two metal leads were laid down on the film to subsequently act as electrodes. After drying for 1 h at 60° C., the film shows an increase in the resistance when the temperature increases by the external heat contribution. The results are recorded in FIG. 1. Under a voltage of 110 V, the coating is heated by the Joule effect and the intensity decreases as the temperature increases. The results are recorded in FIG. 2.

EXAMPLE 2

Blends of Kynar®9301 and of graphite 9000 were prepared. These blends were dissolved in a solvent and then dried at ambient temperature. The results are recorded in the following Table 1.

TABLE 1

| % B (graphite) | Solvent | Thickness mm | Distance between the contacts/width, mm | R, ohm | U, V | T, °C. | I, mA |
|---|---|---|---|---|---|---|---|
| 50 | MEK | 0.1 | 60/70 | 43 | 38 | 70 | |
| 45 | MEK | 0.1 | 80/60 | 75 | 43 | 50 | 266 |
| 40 | MEK | 0.06 | 90/70 | 180 | 50 | 50 | |
| 35 | MEK | 0.06 | 90/70 | 640 | 60 | 50 | |
| 30 | MEK | 0.05 | 75/65 | 350 | 60 | 50 | 125 |
| 25 | MEK | 0.045 | 80/60 | 980 | 67 | 50 | 60 |
| 40 | Acetone | 0.085 | 90/70 | 114 | 40 | 50 | 223 |
| 35 | Acetone | 0.055 | 90/65 | 315 | 70 | 50 | 16 |
| 30 | Acetone | 0.045 | 85/65 | 325 | 75 | 50 | 15 |
| 20 | Acetone | 0.1 | 70/80 | 530 | 120 | 50 | 16 |
| 15 | Acetone | 0.1 | 70/80 | 1337 | 210 | 44 | 5 |
| 10 | Acetone | 0.1 | 70/80 | 15200 | 210 | 35.5 | 2.4 |

It is found that the desired temperature (for example 50° C.) can be obtained either by varying the voltage or by modifying the polymer/graphite proportion or via the geometry (the thickness or the distance between the terminals).

EXAMPLE 3

The paint was prepared, based on a 7% solution of PVDF homopolymer (KYNAR®500) in DMF, by adding 25% (with respect to PVDF) of graphite. A 10×10 cm insulating ceramic plate was coated and two copper terminals were stuck to the ends of the surface. The coating was dried at 120° C. for 4 h, then it was annealed at 170° C. for 30 min and cooled to ambient temperature.

Before the test, the plate was stored for 2 months. The resistance is 837 ohms and the thickness is approximately 50 μm.

A 150 V alternating voltage was applied to the terminals and a change in the temperature was monitored. After approximately 30 min, the temperature stabilized at 84° C. and increased slowly to 91° C. over 5 days and remained constant (±1° C.) for 2 months. After this test, the resistance of the plate fell slightly (750 ohms).

For several days, the plate was placed under the same voltage and still retained the same temperature (91±1° C.).

This test shows a very good performance of the Kynar 500/graphite heating paint.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A composite material comprising, by weight, the total being 100%:
   A) 40 to 90% of a polyvinylidine fluoride (PVDF) homopolymer or copolymer crystallized essentially in the β form,
   B) 10 to 60% of a conductive filler,
   C) greater than 0% but not more than 40% of either a polyvinylidene fluoride homopolymer or copolymer which is not crystallized in the β form or a vinylidene fluoride-hexafluoropropylene copolymer (VF2-HFP) comprising at least 85 mol % of VF2,
   D) 0 to 40% of a filler other than C, such that the crystals in the β form are nucleated on the surface of the conductive filler.

2. A material according to claim 1, wherein the conductive filler (B) comprises a metal powder, carbon black, graphite or a metal oxide.

3. A material according to claim 2, comprising (D) wherein (D) comprises at least one of silica, polymethyl methacrylate and a UV inhibitor.

4. A material according to claim 1, in which (A) is chosen from copolymers of VF2 and trifluoroethylene (VF3) having at least 60 mol % of VF2.

5. A material according to claim 1, in which (A) comprises at least one member selected from the group consisting of copolymers of VF2, of tetrafluoroethylene (TFE) and of HFP having at least 15 mol % of TFE units.

6. A material according to claim 1, in which (A) comprises at least one VF2-TFE-HFP copolymer with a respective molar composition 60 to 80/15 to 20/0 to 25.

7. A material according to claim 1, wherein the conductive filler (B) comprises a metal powder, carbon black, graphite or a metal oxide.

8. A material according to claim 1, wherein the conductive filler (B) comprises graphite.

9. A material according to claim 1, comprising (D) wherein (D) comprises at least one of silica, polymethyl methacrylate and a UV inhibitor.

10. An article comprising an insulating surface coated with the composite material of claim 1, wherein the insulating surface is a ceramic.

11. A paint comprising a solvent dispersion of the composite material according to claim 1.

12. A material according to claim 1, in which (C) comprises said PVDF homopolymer which is not in the beta form.

13. A material according to claim 1, in which (C) comprises said VF2-HFP copolymer comprising at least 85 mol % of VF2.

* * * * *